Figure 1:
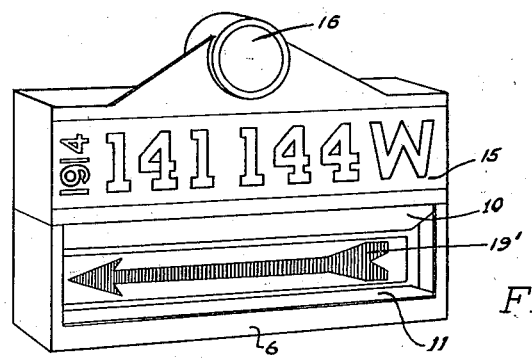

W. F. HOEFS.
AUTOMOBILE SIGNALING DEVICE.
APPLICATION FILED JUNE 19, 1915.

1,174,573.

Patented Mar. 7, 1916.
3 SHEETS—SHEET 1.

INVENTOR
William F. Hoefs
BY
Morrell, Keeney & French
ATTORNEY

W. F. HOEFS.
AUTOMOBILE SIGNALING DEVICE.
APPLICATION FILED JUNE 19, 1915.

1,174,573.

Patented Mar. 7, 1916.
3 SHEETS—SHEET 2.

INVENTOR
William F. Hoefs
BY
Morsell, Keeney & French
ATTORNEY

W. F. HOEFS.
AUTOMOBILE SIGNALING DEVICE.
APPLICATION FILED JUNE 19, 1915.

1,174,573.

Patented Mar. 7, 1916.
3 SHEETS—SHEET 3.

INVENTOR
William F. Hoefs

BY
Morsell, Keeney & French
ATTORNEY

UNITED STATES PATENT OFFICE.

WILLIAM F. HOEFS, OF MILWAUKEE, WISCONSIN, ASSIGNOR OF ONE-HALF TO ADOLPH GROSSWITZ, OF MILWAUKEE, WISCONSIN.

AUTOMOBILE SIGNALING DEVICE.

1,174,573.  Specification of Letters Patent.  Patented Mar. 7, 1916.

Application filed June 19, 1915. Serial No. 35,077.

*To all whom it may concern:*

Be it known that I, WILLIAM F. HOEFS, a citizen of the United States, and resident of Milwaukee, in the county of Milwaukee and State of Wisconsin, have invented new and useful Improvements in Automobile Signaling Devices, of which the following is a description, reference being had to the accompanying drawings, which are a part of this specification.

The invention relates to electrical signaling devices for vehicles, particularly automobiles.

Heretofore visible signaling devices have been employed on vehicles to indicate in which direction the driver intended to turn, when nearing a crossing, so as to warn the person behind him of his intention and for this purpose an arrow was displayed indicating the direction. Certain disadvantages are, however, apparent in constructions of this kind, owing to the fact that people will not always heed a visible signal, but must have their attention especially directed to it so that the present invention designs to provide a signaling device which is provided with a visual signal for indicating the direction the car will be turned and an audible signal simultaneously operable with the visual signal to call people's attention to the visual signal.

Heretofore devices of the general character first described have been constructed in which the signaling device is operated by a circuit closure which is automatically controlled by the steering gear of the vehicle, but such a construction is objectionable, owing to the fact that the signal is not given until the driver starts turning and this is ordinarily too late for the party in the vehicle behind to heed the signal and consequently the present invention designs to provide a manually operable circuit closure for controlling the signaling device so that the driver can give the signal in sufficient time to enable the party behind him to heed it.

Another improved feature of this invention is to provide a visual signal which is at all times visible and cannot become soiled or obliterated by dust and dirt from the roadway and to accomplish this purpose the visual indicator is located wholly within a casing which is provided with a pair of closing doors which are simultaneously operated with the operation of the signaling device, but which exclude the dust and dirt from the casing when the signaling device is not operating and consequently keep the visual signal clear and distinct.

The invention consists in the several features hereinafter set forth and more particularly defined by claims at the conclusion hereof.

Figure 2:
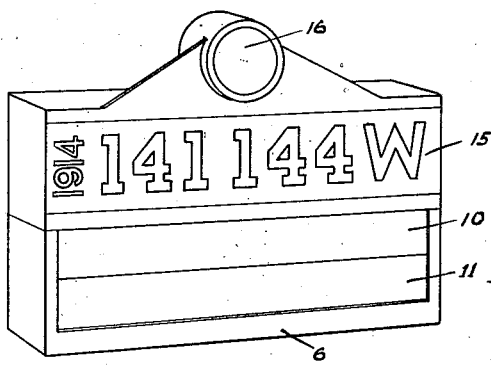
Figure 3:
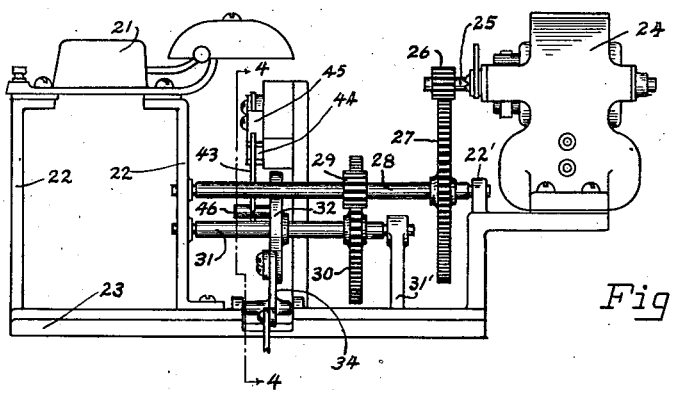
Figure 4:
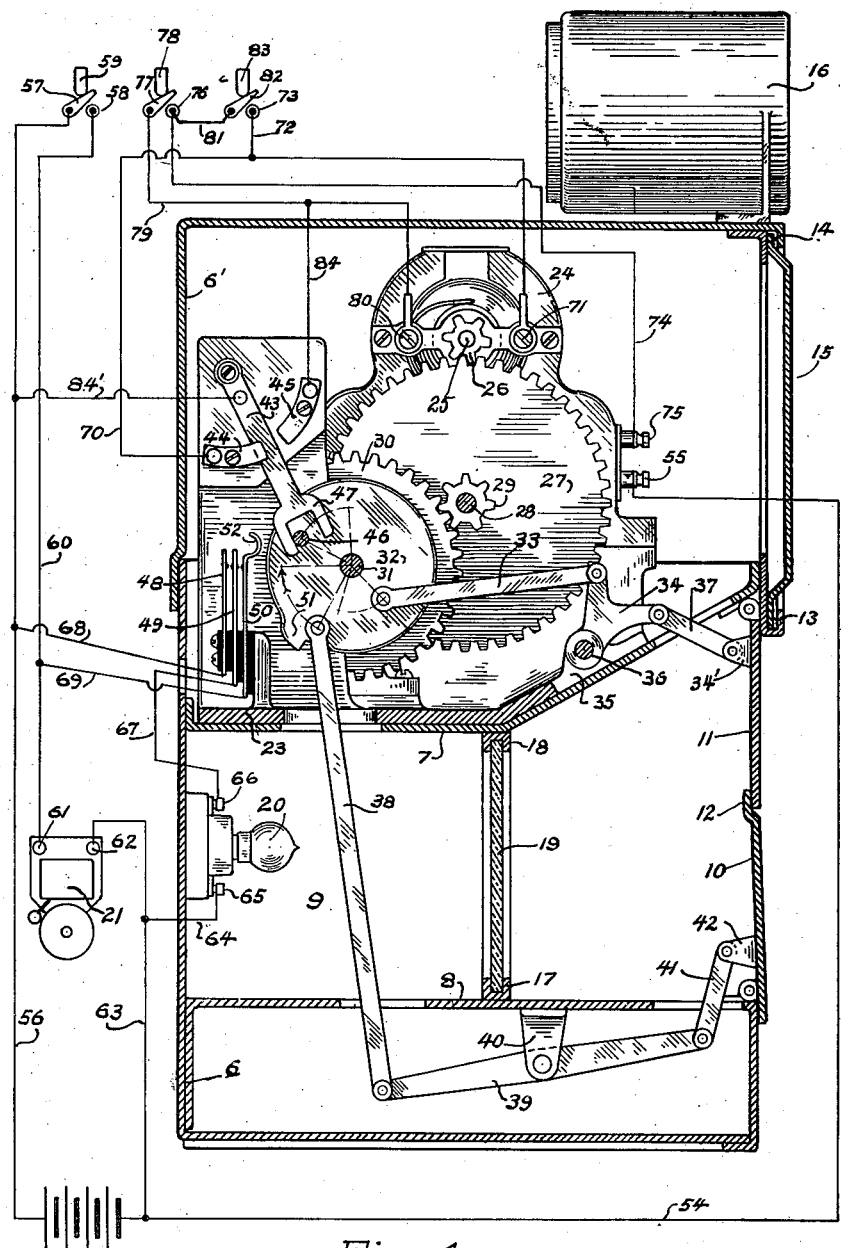
Figure 5:
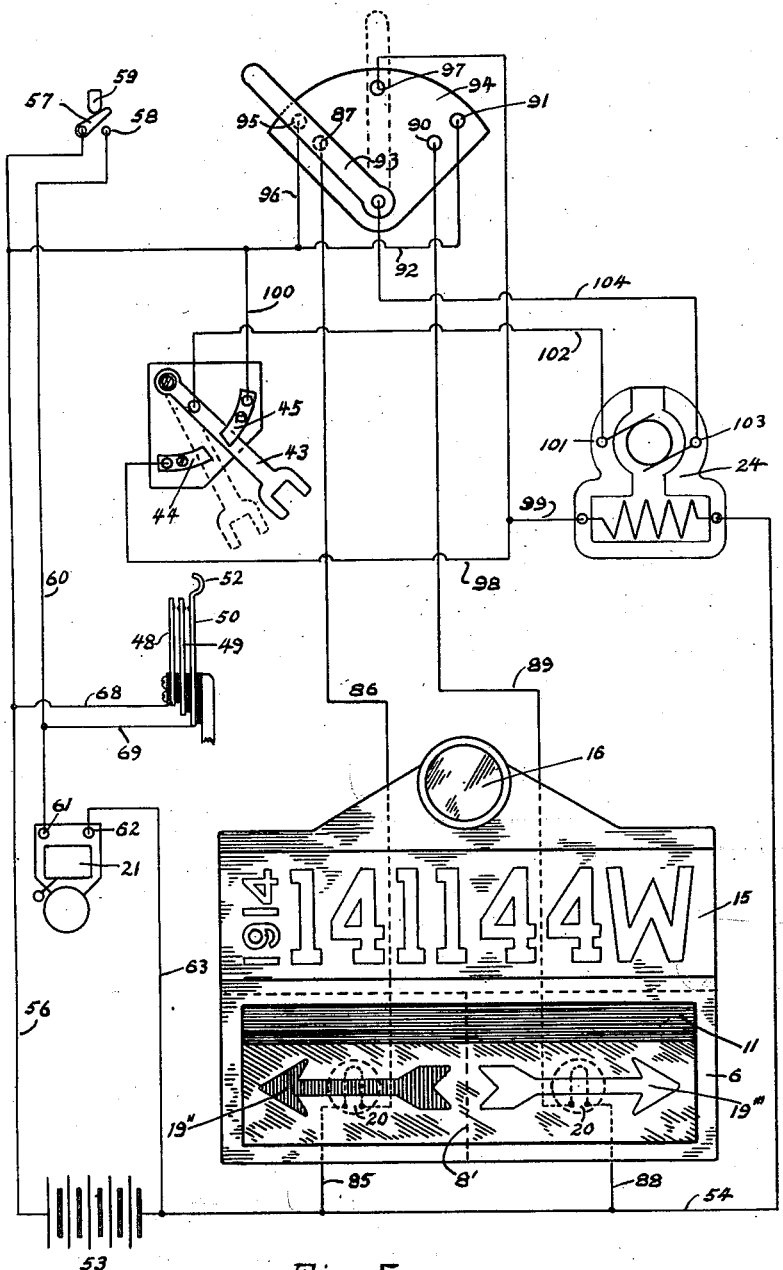

In the drawings, Figure 1 is a perspective view of the device embodying the invention showing the casing doors open and the visual indicator displayed therein; Fig. 2 is a view similar to Fig. 1, showing the casing doors closed; Fig. 3 is a detail view of the mechanism used in connection with the signaling device and which is located in the upper part of the casing; Fig. 4 is a section taken on line 4—4 of Fig. 3; Fig. 5 is a diagrammatic view of a modified form of construction from that shown in Fig. 4.

The signaling device comprises a casing 6, an electrically operated visual signal within the casing, an electrically operated audible signal within the casing, and electrically operated means in the casing for protecting the visual signal, a plurality of circuit closures for controlling the operation of the audible and visible signal and the signal-protecting means.

The casing 6 consists of the box body, a removable top 6', a longitudinally extending partition 7 therein and a longitudinally extending partition 8 disposed adjacent the bottom of the casing, said partitions together with the back of the box forming a visual signal compartment 9, doors 10 and 11 pivotally secured to the partitions 8 and 7 respectively at the front of the box and an extension 12 on the door 10 against which the lower end of the door 11 abuts to form a dust tight closure between the doors, guideways 13 and 14 formed in the front of the top of the casing so as to receive a slidably removable number plate 15; and a tail light 16 is carried on the top of the casing. Frame members 17 and 18 are secured to the partitions 8 and 7 respectively to secure a piece of transparent material, preferably of glass, in position within the visual compartment 9.

In Figs. 1 to 4 inclusive I have shown a red indicating arrow delineated on a black background. I only show one arrow 19', because the turn to the right is always made on the near side of the street in the direction the vehicle is moving so that there is little occasion for a signal as the operator simply turns the right hand corner of the crossing, but the difficulty comes when it is desired to turn the vehicle to the left, as it must then be driven across the path in which it has been proceeding, along with the vehicles behind it. Consequently in these figures I have shown but one arrow for indicating when the vehicle is to make a turn to the left.

In Fig. 5 I have shown left and right hand indicating arrows 19'' and 19''' delineated on the plate 19 and circuit connections, hereinafter described, for lighting the proper light to display the proper arrow and a partition 8' divides the compartment 9 into two compartments with a light in each so that the operator may signal in either direction. he intends to turn.

The visible signaling means comprises incandescent lights 20 mounted within the light compartment 9 and adapted to be operated simultaneously with the opening of the doors 10 and 11, the circuit connections being hereinafter described.

The audible signal consists of an electric bell 21 of usual construction mounted upon uprights 22 on a base member 23 which rests upon the partition 7 and electrical connections, hereinafter described, are provided for operating the bell alone or the bell in conjunction with the visual signaling means.

The means for opening and closing the doors to the light compartment comprises an electric motor 24, the shaft 25 of which is provided with a gear 26 which meshes with a gear 27 mounted on a longitudinally extending shaft 28 which is journaled in one of the uprights 22 and the upright 22', which shaft carries a gear 29 in mesh with a gear 30 on a horizontally disposed shaft 31 which is also journaled in one of the uprights 22 and in the upright 31'. This shaft 31 carries a cam disk 32 and linkage connections are provided between each of the pivoted doors 10 and 11 and this disk 32 whereby the rotation of the disk will cause the doors to move inwardly or outwardly. The linkage connecting the disk 32 to the door 11 consists of a link 33 pivotally connected to the disk 32 at one end and to one arm of a bell crank lever 34 at the other, which lever is pivotally mounted in the bearing brackets 35 by means of a pin 36, and a link 37 is pivotally connected to the other arm of the bell crank 34 and to a lug 34' on the door 11. The linkage for connecting the door 10 to the disk 32 consists of a link 38 pivotally connected at one end to the disk 32 and at its other to a lever 39 which is pivotally mounted intermediate its ends on a bracket 40 and which is pivotally connected at its other end to one end of a link 41, the other end of said link being pivotally connected to a lug 42 on the door 10. Resultantly, the rotation of the disk 32 through the shaft 31, gears 30 and 29, shaft 28, gears 27 and 26, shaft 25 of the motor 24, during the operation of the motor, will cause the linkage connected to the doors to move the doors either inwardly to open position or outwardly to the position shown in Fig. 4, depending upon the direction of rotation of the motor which is controlled through circuit connections hereinafter described.

The means for reversing the direction of the motor comprises a switch which is automatically operated upon the rotation of the disk 32. This means consists of a movable contact lever 43 pivotally mounted within the casing and adapted to be swung into engagement with either of the fixed contacts 44 and 45 by means of a pin 46 secured to the disk 32, which pin is movably mounted within the forked end 47 of the lever 43.

The means for operating both the doors and the visual signal comprises flexible contacts 48, 49 and 50 mounted within the casing and insulated from each other but provided with tip contacts adapted to be brought into engagement with each other to close the circuit through the contacts, which circuit is automatically closed by means of a cam 51 on the disk 32 which contacts with a finger 52 on the contact 50, thus moving the contact 50 inwardly against the contact 49 which in turn is moved into contact with the contact 48.

Having described the mechanical construction within the case, the circuit connections, shown in Fig. 4, will now be described. The battery 53 is connected by a conductor 54 to one of the terminals 55 of the field circuit of the motor 24. The other side of the battery 53 is connected by a conductor 56 to a movable switch contact 57 which is adapted to be brought into contact with a fixed contact 58 by a push button 59. A conductor 60 connects the contact 58 with one of the terminals 61 of the bell 21. The other terminal 62 of the bell 21 is connected to the conductor 54 by a conductor 63 and a conductor 64 leads from the conductor 63 to the terminal 65 of the lamp 20. The other terminal 66 of the lamp 20 is connected by a conductor 67 to the medial contact 49. A conductor 68 connects the contact 48 with the conductor 56 and a conductor 69 connects the contact 50 with the conductor 60. A conductor 70 connects the contact 44 of the motor switch with one of the terminals 71 of the motor armature circuit and a conductor 72 leads from the conductor 70 to a fixed contact 73. A conductor 74 connects the other terminal 75 of the field circuit of the motor to a fixed contact 76 and a movable contact 77 operable by means of the push button 78 connects the fixed contact 76 through the conductor 79 with the other terminal 80 of the motor armature circuit. The fixed contacts 76 and 73 are connected across through a conductor 81 and a movable switch contact 82 under the control of the push button 83. A conductor 84 connects the motor switch contact 45 with the conductor 79 and a conductor 84' connects the motor switch lever 43 with the conductor 56.

In Fig. 5, owing to the fact that two individual operable lamps 20 are used in connection with the device shown in Fig. 4, some of the circuit connections have been changed. In this instance a conductor 85 is connected to the conductor 54 and one terminal of the left hand lamp 20. The other terminal of this lamp is connected by a conductor 86 to a fixed switch contact 87. A conductor 88 connects the conductor 54 to one of the terminals of the right hand lamp 20 and the other terminal of this lamp is connected by a conductor 89 to a fixed switch contact 90. A fixed switch contact 91 is connected by a conductor 92 to the conductor 56 and the contacts 90 and 91 are adapted to be bridged by a movable switch contact lever 93 pivotally mounted on a switch board 94. A fixed contact 95 on the switch board is connected to the conductor 92 by a conductor 96 and the contacts 87 and 95 are adapted to be bridged by the switch contact lever 93. The motor switch contact 44 is connected to a fixed contact 97 on the switch board by a conductor 98 from which a conductor 99 leads to one of the terminals of the field circuit of the motor 24. The motor switch contact 45 is connected to the conductor 92 by a conductor 100. The motor switch lever 43 is connected to one of the terminals 101 of the armature of the motor 24 by a conductor 102. The other terminal 103 of the armature is connected to the switch contact lever 93 by a conductor 104.

Having described the various parts of the two forms of my invention, their operation will now be described. With the device shown in Fig. 4, if the driver of the vehicle simply desires to give an alarm, the push button 59 is actuated to bring the movable contact 57 into contact with the fixed contact 58 whereby the circuit connection through the battery 53, conductor 63, bell 21, conductor 60, contacts 58 and 57, conductor 56 to the battery is established thus causing the ringing of the bell 21. If the operator desires to display the signal, ring the bell and open the doors, it is done by operating the push button 78 to close the contacts 77 and 76. When this occurs current passes from the battery 53 through the conductor 54, post 55, field of motor 24, post 75, conductor 74, contacts 76 and 77, conductor 79, terminal 80, armature of motor 24, terminal 71, conductor 70, contact 44, lever 43, conductor 84', conductor 56 back to the battery 53, thus energizing the motor and starting its operation causing a rotation of the shaft 25 which, through the gearing previously described, will rotate the disk 32 in the direction indicated by the arrow thereby causing the linkage connected thereto to move the doors 10 and 11 inwardly to display the arrow on the plate 19 and at the same time causing the pin 46 to move the lever 43 upwardly into engagement with the contact 45. When this occurs, the current passes from the battery 53 through the conductor 54, terminal 55, field of motor, terminal 75, conductor 74, contacts, 76 and 77, conductor 79, conductor 84, contacts 45 and 43, conductor 84', contact 56 to the battery. At the same time the cam 51 on the disk 32 strikes the finger 52 on the contact 50 and closes the circuits between the contacts 48, 49 and 50 so that some of the current flowing through the conductor 56 passes through the conductor 68, contacts 48, 49 and 50, conductor 69, conductor 60 through the bell and conductor 63 to the conductor 54 thus ringing the bell and some of the current from the conductor 68 will pass from the contact 48 through the contact 49, conductor 67, lamp 20, conductor 64 to the conductor 63, thus lighting the lamp. The ultimate result of the operator actuating the push button 78 is the opening of the doors 10 and 11 simultaneously with the ringing of the bell 21 and the lighting of the lamp 20 to display the signal. After the switch lever 43 moves out of contact with the contact 44 the momentum of the disk is sufficient to move the lever into contact with the contact 45. When this occurs the armature circuit of the motor is cut out through the conductor 84.

When it is desired to discontinue the signaling, the operator resets the device by actuating the push button 83 which causes the reversal of the current through the armature of the motor, the current passing through the battery 53, conductor 54, contact 55, field of motor 24, contacts 75, conductor 74, contacts 76, conductor 81, contacts 82 and 73, conductors 72 and 70, armature of motor 24, post 80, conductor 79, conductor 84, contacts 45 and 43, conductors 84' and 56 to the battery 53. Thus reversal of the current causes the disk to revolve in the opposite direction, closing the doors and moving the switch lever 43 downwardly into engagement with the contact 45, thus cutting out the armature circuit of the motor through the conductor 70, contact 44 and lever 43. The contacts 48, 49 and 50 are normally out of contact with each other so that the reversal of the direction of rotation of the disk 32 and the consequent disengagement of the cam 51 from the finger 52 open the circuit through the light and the bell and stops their operation.

In the construction shown in Fig. 5, the push button 59 operates the bell alone, as previously described. The switch contact lever 93, is normally in the position shown in dotted lines in Fig. 5, and when it is desired to operate the doors and the left hand light and the bell the operator throws the lever 93 to the left closing the circuit between the contacts 87 and 95 thus causing the current to flow through the battery 53, conductor 54, field of motor 24, conductor 99, conductor 98, contact 44, lever 43, conductor 102, armature of the motor, conductor 104, lever 93, contact 95, conductor 96, conductor 92, conductor 56 to the battery. This causes the motor to operate and rotate the disk 32 to open the doors and to throw the lever 43 upwardly into full line position and to cause the cam 51 to engage the contacts 48, 49 and 50, after which the current to the motor is cut out by the motor switch moving to open position and the current flows from the battery 53 through the conductor 85, left hand lamp 20, conductor 86, contacts 87, 93 and 95, conductors 96, 92 and 56 back to the battery, thus lighting the lamp. Some of the current passes from the conductor 56 through the conductor 68, contacts 48, 49 and 50 which are closed by the disk 32, conductors 69 and 60 through the bell 21, conductor 63 to the conductor 54 thus ringing the bell. To shut off the light and bell and to close the doors the lever 93 is moved to midposition whereby the current from the battery 53 passes through the conductor 54, field of armature 24, conductor 99, conductor 98, contact 97, lever 93, conductor 104, armature of the motor, conductor 102, lever 43, contact 45, conductor 100, conductor 92, conductor 56 back to the battery, thus energizing the motor and causing it to reverse its direction to throw the switch 43 downwardly into the position shown in dotted lines. With the switch levers 93 and 43 in dotted line positions, the armature is short circuited through the switch 43 and contact 44 thus stopping further operation of the motor. Also the return of the disk to inoperative position causes the contacts 48, 49 and 50 to separate and thus cut out the bell and the moving of the switch lever 93 to dotted line position breaks the connection between the contacts 95 and 87 thus cutting out the lamp. To light the right hand lamp the lever 93 is turned to the right so that it engages the contacts 90 and 91 and thus establishes a connection through the conductor 88, the right hand lamp 20, conductor 89, contact 90, lever 93, contact 91, conductor 92, conductor 56 back to the battery. The bell and door are operated as before through the same connection.

The invention thus exemplifies a signaling device whereby both a visual and an audible signal are given simultaneously with the opening of the doors in the casing to display the visual signal, or the audible signal given alone or either one of two visual signals given in connection with the audible signal.

The invention is not to be restricted to the details of construction herein set forth, but may be varied so as to be within the scope of the appended claims.

What I claim as my invention is:—

1. In an electrical signaling device, the combination, with a casing having a compartment therein, of a direction indicator within said compartment, a door for normally closing said compartment, an electrical circuit, an electric light in said circuit for displaying said indicator, an electric motor in said circuit and operatively connected to said door, a switch for said light, a control switch for said motor, and an automatically operated motor-reversing switch.

2. In an electrical signaling device, the combination, with a casing having a compartment therein, of a direction indicator within said compartment, a door for normally closing said compartment, an electrical circuit, an electric light in said circuit for displaying said indicator, an electric motor in said circuit and operatively connected to said door, a motor-operated switch for said light, a control switch for the motor, and an automatically operated motor-reversing switch.

3. In an electrical signaling device, the combination, with a casing having a compartment therein, of a visual direction indicator within said compartment, a door for protecting the indicator, an electrical circuit, an electric light in said circuit for displaying said indicator, an audible signal in said circuit, an electric motor in said circuit and operatively connected to said door, normally open flexible contacts for said light and audible signal circuits, motor-operated means for closing said contacts, a motor-reversing switch, a control switch for the motor.

4. In an electrical signaling device, the combination, with a casing having a visual direction indicator and an audible signal therein, of a door on said casing to protect the visual indicator, an electric motor for opening and closing said door, and electrical means for simultaneously operating said indicator, signal and motor means.

5. In an electrical signaling device, the combination, with a casing having a compartment therein, of a direction indicator within said compartment, a door for normally closing said compartment, an electrical circuit, an electric light in said circuit for displaying said indicator, an audible electric signal in said circuit, an electric motor in said circuit and operatively connected to said door for opening and closing the same, a circuit closure whereby the light, signal and door will be simultaneously operated to display the indicator and give the signal, and another circuit closure for reversing the motor to shut the door and shut off the light and signal.

In testimony whereof, I affix my signature.

WILLIAM F. HOEFS.